United States Patent [19]

Pittard et al.

[11] Patent Number: 5,277,055
[45] Date of Patent: Jan. 11, 1994

[54] IMPACT AND IMPACT-ROTARY TOOL TESTING APPARATUS USING ROTARY SPEED AND IMPACT ENERGY

[75] Inventors: Gerard T. Pittard; William J. McDonald; Terry P. Clifton; William C. Herben, all of Houston, Tex.

[73] Assignee: Consolidated Edison Company of New York, Inc., New York, N.Y.

[21] Appl. No.: 753,606

[22] Filed: Aug. 30, 1991

[51] Int. Cl.$^5$ .............................. G01M 19/00
[52] U.S. Cl. ...................................... 73/11.01
[58] Field of Search .................. 73/11, 865.3, 865.9, 73/11.01, 12.07; 175/40

[56] References Cited

U.S. PATENT DOCUMENTS

| | | | |
|---|---|---|---|
| 842,136 | 1/1907 | Chambers | 73/11 |
| 1,375,604 | 4/1921 | Olsen | 73/11 |
| 1,576,465 | 3/1926 | Pryce | 73/11 |
| 2,761,307 | 9/1956 | Williams | 73/11 |
| 2,909,922 | 10/1959 | Haman | 73/11 |
| 4,580,130 | 4/1986 | Tokunga et al. | 324/175 |
| 4,725,777 | 2/1988 | Tousch | 324/173 |
| 4,901,587 | 2/1990 | Deremo et al. | 73/11 |

FOREIGN PATENT DOCUMENTS

| | | | |
|---|---|---|---|
| 170830 | 7/1916 | Canada | 73/11 |
| 125785 | 3/1958 | U.S.S.R. | 73/11 |
| 714208 | 2/1980 | U.S.S.R. | 73/11 |
| 1016709 | 7/1983 | U.S.S.R. | 73/11 |

Primary Examiner—Robert Raevis
Assistant Examiner—Nashmiya Ashraf
Attorney, Agent, or Firm—Brooks Haidt Haffner & Delahunty

[57] ABSTRACT

A test stand has a base supporting standards on which are mounted a crossbar and an adjustably locatable header. The header supports an actuator for raising and lowering the crossbar which holds V-blocks for engaging the handles of an impact or impact-rotary tool and which applies downward pressure to the tool. The tool chuck is fitted to the top of a guide rod whose lower end passes with a sliding fit through a disc to which it is keyed and bears against a piston in an hydraulically pressurized cylinder. Sensors detect rotation of the disc and movement of the piston to provide information to a computer as to impact energy and rotary speed. A manifold fitted with sensors for temperature, pressure, and flow rate supplies operating air to the tool. The computer includes a database with stored information as to past history of the tool and the manufacturer's recommended operating specifications to which the measured data is compared.

15 Claims, 4 Drawing Sheets

IMPACT AND IMPACT-ROTARY TOOL TESTING APPARATUS USING ROTARY SPEED AND IMPACT ENERGY

BACKGROUND OF THE INVENTION

The present invention relates to a system for overseeing the performance and history of impact and impact-rotary tools.

Pneumatically-powered impact and impact-rotary tools are employed for a variety of purposes. Examples are the use of rotary rock drills and demolition tools in mining and quarrying and the removal of asphalt and concrete surfaces to gain access to underground utilities such as gas, electric and water lines. In particular, hand operated pneumatic tools are employed extensively by the distribution utility industry in the installation repair and maintenace of underground or buried lines and mains.

Unless the tools are adequately lubricated and maintained their operating efficiency can fall off significantly from manufactured specifications. Lowered kinetic impact energy or impact rate extends the time required to open any given section of pavement. By accumulating data from numerous crews as to the time taken to break out a 2'×4' asphalt pavement and separately determining the operating efficiency of the tools as a percentage of the efficiency for an as-manufactured tool, it has been determined that a tool operating at 52% efficiency takes over twice as long to break out the 2'×4' section as a tool operating at close to peak efficiency (95%). Consequently, if the tools can be maintained at a close to top efficiency it will result in considerable saving of labor time and, therefore, money.

Various attempts have been made heretofore by others to measure the operating parameters of rotary and impact tools. Various United States patents describe test rigs for testing pneumatic impact tools in which the impact force generated by the tool is compared with the energy input to the tool. U.S. Pat. No. 842,136 describes a method of testing pneumatic tools in which tool efficiency is determined by measuring and comparing the work done with the energy consumed. The apparatus described in Pat. No. 1,375,604 compares the tool being tested against the performance of a standard tool by comparing the quantity of air consumed by each in a given time. Pat. No. 1,576,465 describes apparatus that measures the rotating speed of the tool when operating under a constant impact loading force as well as against a constantly loaded rotary means.

A chart recorder is used to produce a graphic record of the tool operation in Pat. No. 1,790,971. Pat. No. 2,047,193 shows a device in which a piston compresses an oil/air column to indicate the integrated impact force. The apparatus in Pat. No. 2,761,307 functions to test both the output pressure of a pneumatic jack and the rotation of the plunger. In Pat. No. 4,901,587 each test drill is compared to a standard. The parameters compared are number of pecks per cycle time, the drill travel per cycle time, and the rpm of the drill. However, none of the devices heretofore known is capable of providing a complete evaluation of any of a number of impact and rotary-impact tools, and none provides the total history of the selected tool.

SUMMARY OF THE INVENTION

It is therefore an object of the present invention to provide a system for rapidly measuring the performance of impact and impact-rotary tools.

Another object is to provide a computerized data acquisition system combined with an instrumented flow loop and a specially constructed impacting stand to collect and interpret tool operating parameters including flow rate, fluid pressures, temperature, rotary speed, kinetic impact energy and impact rate.

In accordance with one aspect of the invention there is provided a system for measuring the performance of impact and impact-rotary tools comprising in combination a test stand for mounting a tool whose performance is to be measured, means for supplying operating power to said tool including means for measuring the energy utilized by said tool, means for measuring an output of said tool, and means for comparing the measured output of said tool against a standard output correlated to said utilized energy, wherein said means for measuring an output of said tool comprises an hydraulic cylinder, a piston disposed within said cylinder for axial movement, circumferential sealing means disposed between said piston and cylinder for developing an hydraulic seal therebetween, said cylinder having one end closed defining with said piston a chamber that is pressurizeable with hydraulic fluid to urge said piston toward an open opposite end of said cylinder, guide means for receiving a tool output rod and for positioning said rod coaxially aligned and in engagement with said piston for driving said piston against said hydraulic fluid to further pressurize said fluid, and pressure sensing means coupled to said cylinder for sensing the changing pressure in said chamber.

In accordance with a further aspect of the invention the system is also provided with a rotatable member having a centered through opening which is mounted between the guide means and the open end of the cylinder with the through opening constructed and positioned to receive therethrough with a sliding fit the tool output rod. Means are provided for coupling the rod to the rotatable member for rotatably driving the member in step with rotation of the rod, and means are included for providing an output signal as a function of the speed of rotation of the rotatable member.

In accordance with yet another aspect of the present invention the system is provided with a computerized database system for storing and supplying information on demand concerning the prior history and manufacturer's standards of the tool to be tested. The means for measuring the energy utilized by the tool is coupled to the database system for feeding the measured energy information to the database system, and the means for measuring an output of the tool has an output coupled to the database system, whereby the measured output of the tool can be compared with the standard output for the tool.

BRIEF DESCRIPTION OF THE DRAWINGS

The invention will be better understood after reading the following detailed description of the presently preferred embodiments thereof with reference to the appended drawings wherein the same reference numerals are used throughout to designate the same or similar parts and in which.

DETAILED DESCRIPTION OF THE PREFERRED EMBODIMENTS

Figure 1:
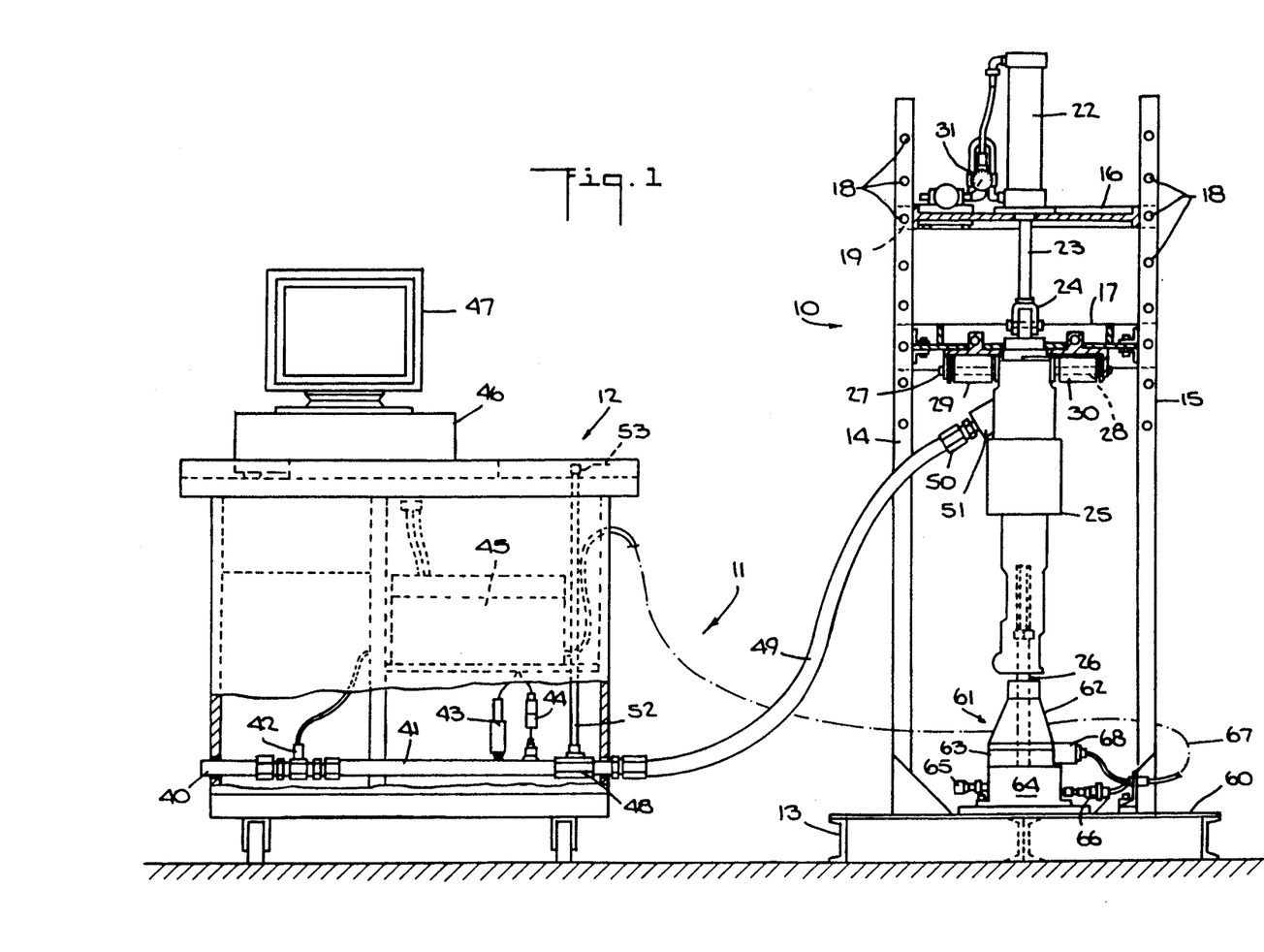
FIG. 1 is a front elevational view of a complete test stand and instrumentation assembly embodying the present invention showing a typical jack hammer in place for testing.
Figures 2, 3, 4, 4A, 4B:
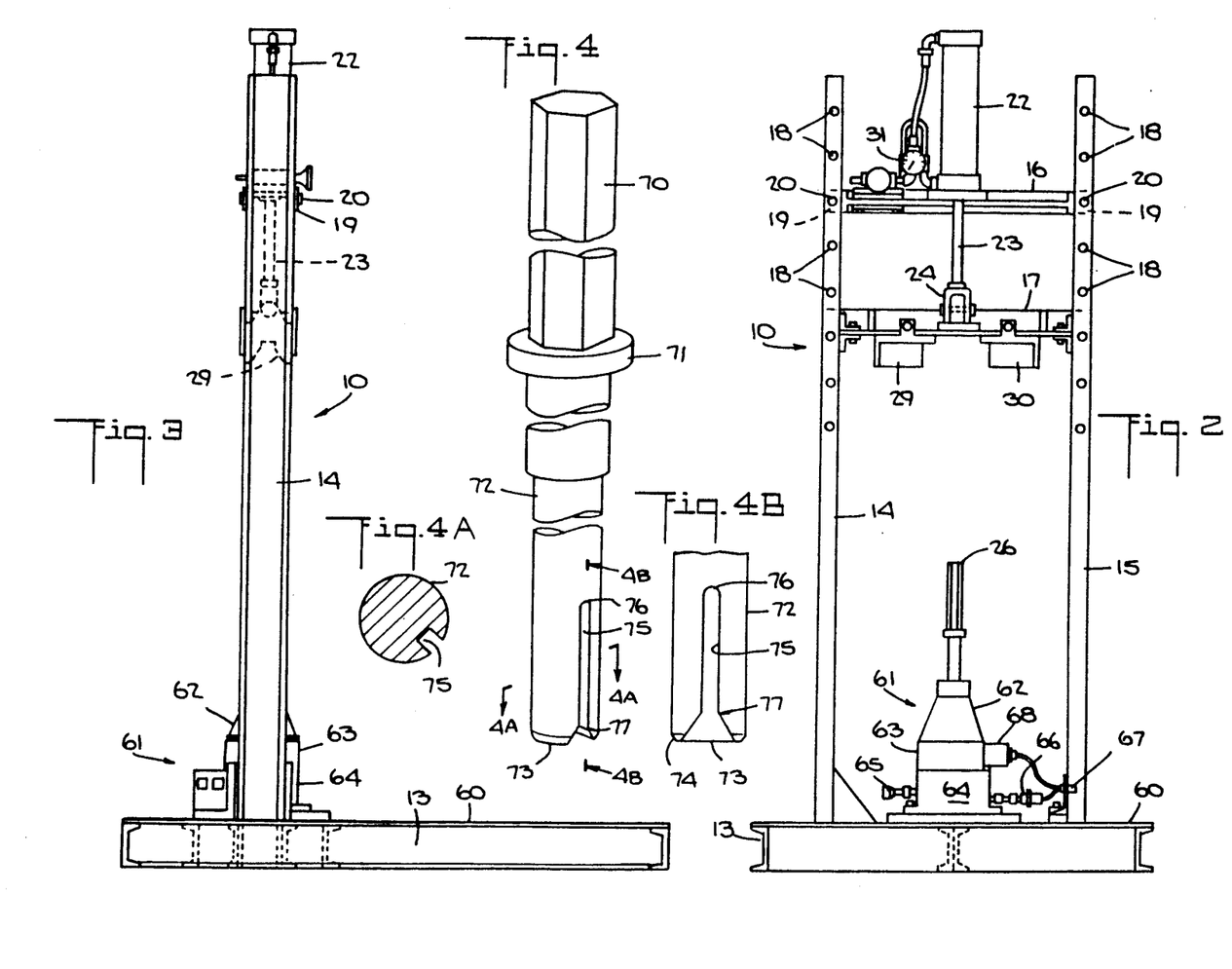
FIG. 2 is a front elevational view of the test stand of FIG. 1 with the tool removed.
FIG. 3 is a side elevational view of the test stand of FIG. 2.
FIG. 4 is a perspective view of one embodiment of a tool output rod for use with the test stand of FIGS. 1 to 3.
FIG. 4A is a cross-sectional view of the tool output rod of FIG. 4 taken along the line 4A—4A.
FIG. 4B is a fragmentary elevational view of the end of the tool output rod of FIG. 4 as viewed in the direction of the arrows 4B—4B in FIG. 4 showing details of the keyway.

Referring to the drawings and particularly to FIGS. 1 to 3, the subject system is illustrated consisting generally of a test stand 10, an instrumented flow loop 11, and an instrument stand 12. The test stand 10, consists of a skid frame base 13 supporting a pair of upright standards 14 and 15, spaced apart and between which is mounted a load bar or header 16 above a crossbar 17. In the illustrated example, the standards 14 and 15 are generally C-shape with a series of spaced apertures 18 formed in the flange portions of each standard along the upper half thereof. The load bar 16 has C-shaped or U-shaped ends 19 that straddle and embrace the respective standard 14 or 15 to which the ends 19 are secured by a removable pin or bolt 20 passed through apertures in the ends 19 and through a corresponding aperture 18 in the respective standard thereby providing a means for adjusting the relative position of the load bar 16 above the skid frame base.

Mounted on the load bar 16 is an actuator 22, preferably an hydraulic piston-cylinder assembly, coupled to a controllable supply of operating fluid (not shown) for positioning its ram 23 at a desired extension. The lower end 24 of the ram is joined to the crossbar 17 which, in turn, is arranged to ride in the vertical direction along the standards 14 and 15. By manipulating the supply of fluid to the actuator 22, the crossbar 17 can be raised to permit a tool such as the jack hammer 25 to be placed in position with its chuck over the upper end of a guide rod 26, and its handles 27 and 28 disposed within the V-groove blocks 29 and 30 suspended under the crossbar 17. The actuator 22 is then operated to lower the crossbar until firm engagement is established between blocks 29 and 30 and the jack hammer handles. The pressure applied to the jack hammer handles can be read off a pressure gauge 31.

The instrumented flow loop 11 consists of a supply of compressed air (not shown) connected at 40 to a fluid manifold or conduit 41 to which is connected a flow sensor 42, a pressure sensor 43, and a temperature sensor 44, the electrical outputs of which sensors are connected through a conventional interface unit 45 with a central processing unit 46 and monitor 47, all of which are mounted on the wheeled cart or stand 12. The manifold 41 is connected through a valve 48 to a hose 49 with a suitable connector 50 for attachment to the supply inlet 51 of the jack hammer 25. In the illustrated embodiment, the valve 48 is connected by an extension rod 52 to a conveniently accessible operating handle 53 located at the cart table top.

Referring to the test stand 10, the base 13 has a reinforced base plate 60 supporting the beams 14 and 15. Removably mounted centrally on the base plate 60 is the tool output sensing assembly 61 consisting of a guide bushing 62, rotary speed assembly 63, and impact sensing pressure cell 64, the details of which will be described below. The guide bushing 62 is used to align the guide rod 26 coaxially with respect to the pressure cell 64 and provide a bearing for the guide rod rotation. Reference numeral 65 designates an hydraulic fitting permitting pressurization of the pressure cell 64. A pressure transducer 66 is coupled to the pressure cell 64 for responding to changes in fluid pressure due to tool impact and has an electrical connection via cable 67 to the interface unit 45. Another transducer 68 is connected to the rotary speed assembly 63 for providing signals indicative of tool rotation through corresponding conductors, also in cable 67, to the interface unit 45.

Details of the guide rod 26 are shown in FIGS. 4, 4A and 4B, to which attention is now directed. As shown in the drawings, the guide rod 26 has an hexagonal section 70 and locking collar 71 at one end designed to duplicate the tool configuration designed to mate with the chuck of the power tool being tested. The opposite end 72 of the guide rod is right circular cylindrical terminating in a flat end 73 normal to the longitudinal axis of the rod 26. The circumferential edge of the end 73 is beveled at 74. A slot 75 is provided extending from a point 76 along an element of the rod to a point 77 where it flares circumferentially or laterally out to the end 73. The slot 75 is dimensioned to function as a keyway cooperating with a key to be described. It should be understood that the guide rod 26 will vary depending upon the power tool being tested and the type tool (e.g., sinker drill, pavement breaker, etc.) that will be used therewith in the field. However, as will appear from the description to follow, the end 72 will have the same construction among all the guide rods intended for use with a particular output sensing assembly 61. The chuck ends will differ depending upon the tool to e tested. A convenient method of constructing a given guide rod is to machine a conventional tool such as a pavement breaker or sinker drill to produce the end 72 that cooperates with the output sensing assembly 61.

Reference should now be had to FIGS. 5 to 8 wherein a first embodiment of the output sensing assembly 61 is shown. The pressure cell 64 consists of a cylinder block 80 provided with a mounting flange 81 and a cylinder bore 82 whose longitudinal axis is perpendicular to base 60. From a consideration of FIGS. 2 and 3 it can be seen that standards, 14 and 15, and the axis of the cylinder 82 lie substantially in a common plane and that the cylinder 82 is located substantially midway between the standards. A free floating piston block 83 makes a sliding fit within the bore 82 with the interface sealed by a pair of O-ring seals 84 and 85. Preferably, the piston 83 and cylinder wall 82 are chromed for better wear resistance. Instead of O-ring seals, T-seals can be used, if desired, for the seals 84 and 85. The hydraulic fitting 65 communicates through a passage 86 with the bore 82 below the bottom of piston 83 when the latter is in raised position riding atop a quantity of oil under pressure within bore 82. Similarly, the pressure sensor 66 in the form of a piezoelectric transducer is coupled through a passage 87 to the bottom of bore 82.

Figure 5:
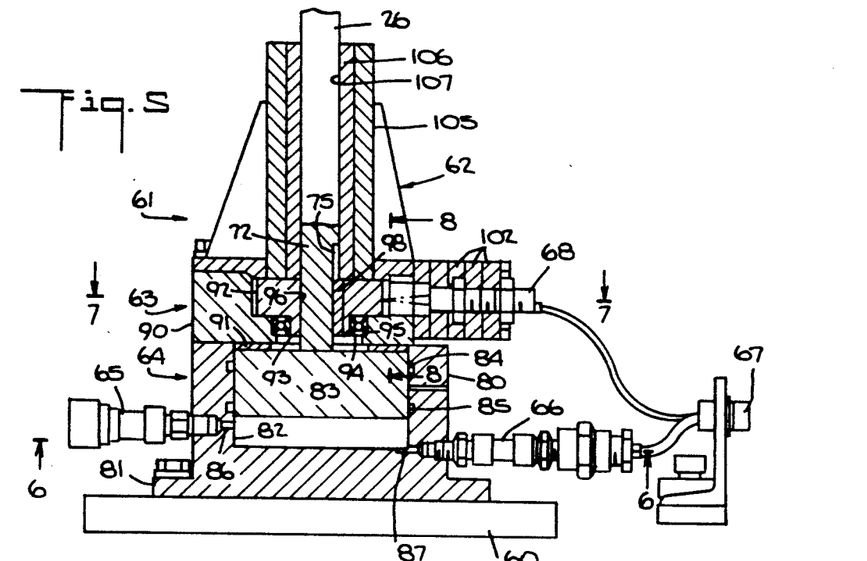
FIG. 5 is a fragmentary view in vertical section of one embodiment of the impact and rotary measuring apparatus forming a part of the test stand of FIGS. 1 to 3, showing details in construction.

Mounted atop the cylinder block 80 is a block 90 separated from the piston 83 by a bronze spacer 91 resembling an oversize washer. A disc 92 provided with a hub 93 is mounted in a bearing 94 press fit into a counterbore 95 in the block 90, as shown. The disc 92 has a centered through bore or opening 96 dimensioned to accommodate the lower end 72 of the guide rod 26 with a loose sliding fit. A keyway slot 97 receives a key 98 which cooperates with the slot 75 in guide rod 26.

Figures 6, 7, 8:
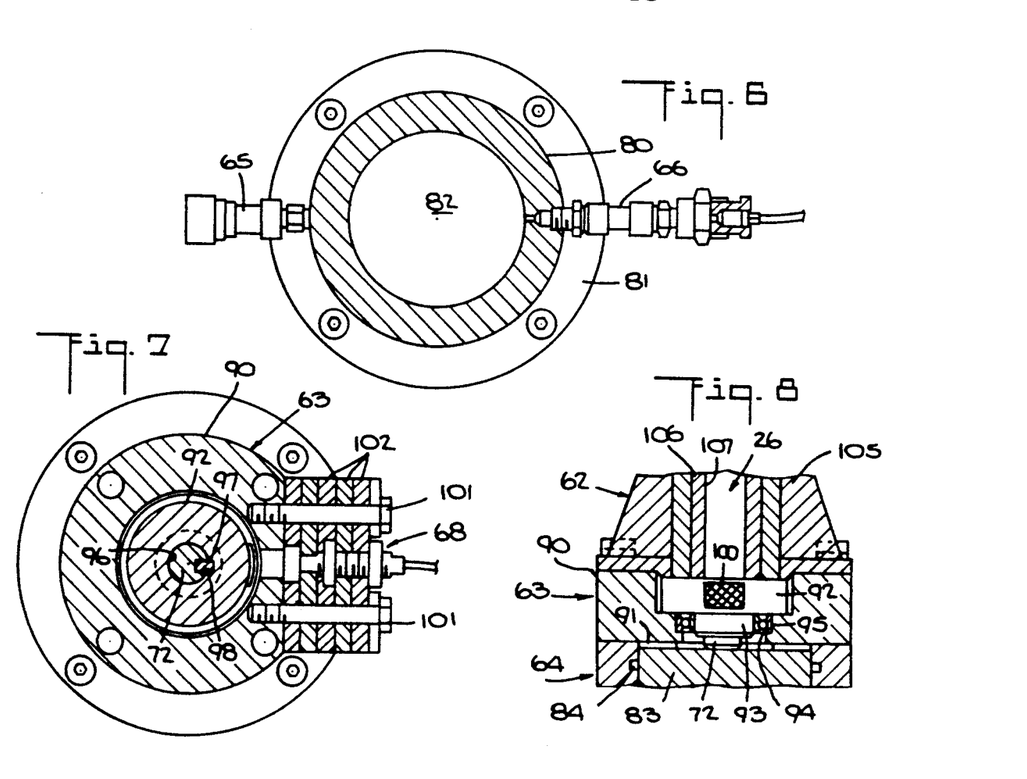
FIG. 6 is a cross-sectional view taken along the line 6—6 in FIG. 5.
FIG. 7 is a cross-sectional view taken along the line 7—7 in FIG. 5.
FIG. 8 is a fragmentary sectional view taken along the line 8—8 in FIG. 5.
Figure 9:
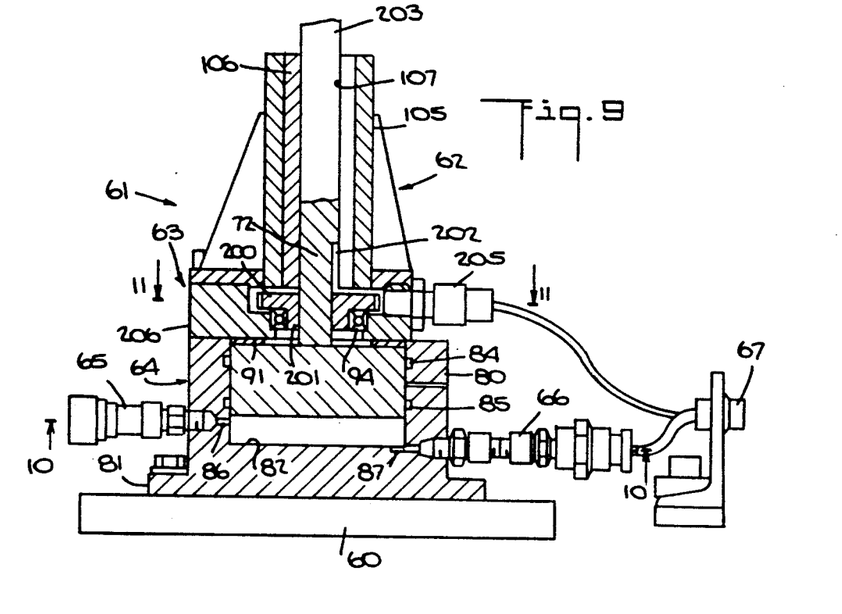
FIG. 9 is a view similar to FIG. 5 showing another embodiment of the invention.
Figures 10, 11, 12:
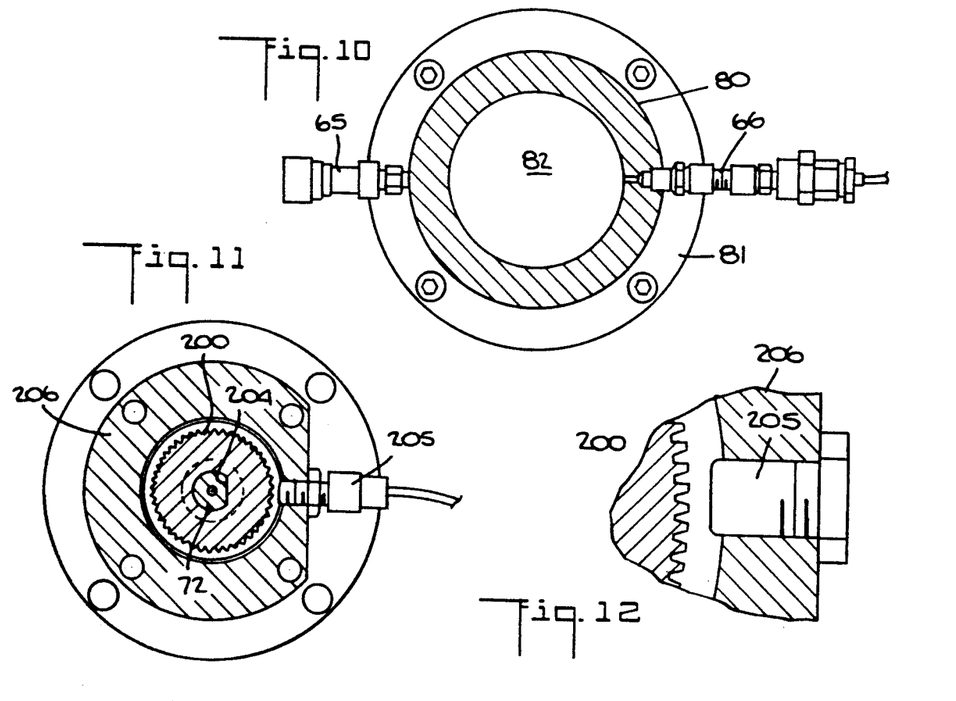
FIG. 10 is a cross-sectional view taken along line 10—10 in FIG. 9.
FIG. 11 is a cross-sectional view taken along line 11—11 in FIG. 9.
FIG. 12 is a fragmentary enlarged sectional view of a portion of FIG. 11 showing a detail thereof.

As shown in FIG. 8, a piece of reflective-polarizing tape 100 is secured to the periphery of disc 92 for cooperating with the transducer 68 which in this embodiment is a photoelectric device which emits a probing beam of light and detects a returning polarized beam for producing an electrical signal indicative of each revolution of the disc 92. The transducer 68 is joined to the block 90 by bolts 101 passing through a series of elastomeric vibration isolation pads 102.

Finally, on top of block 90 is mounted a guide bracket assembly 105 containing a bronze bushing 106 held by a press fit within the assembly 105 and having a bore 107 dimensioned to receive the shaft of the guide rod 26 with a sliding fit.

Before considering the operation of the apparatus including the output sensing assembly 61 shown in FIGS. 5 to 8, reference should be had to FIGS. 9 to 12 which illustrate a modification of the sensing assembly. The difference between the embodiment in FIGS. 9 to 12 and that in FIGS. 5 to 8 resides in the construction of the rotary speed assembly 63 and the manner of keying the rotary sensing element to the guide rod.

Referring to FIGS. 9 to 12, there is provided a disc with a toothed perimeter, e.g., a gear 200, having a hub 201 press fit into the bearing 94. The gear 200 should have circumferentially uniformly disposed teeth. The key 98 is eliminated along with the keyways 75 and 97, and replaced by providing a flat 202 on one side of the guide rod 203 which flat cooperates with a chordal flat 204 in the through bore provided in gear 200.

The optical sensor 68 is replaced by a magnetic sensor 205 mounted directly in the block 206 which is similar to block 90 in FIGS. 5. In all other respects as seen by use of the same reference numerals the construction of the FIG. 9 embodiment is essentially the same as that in FIG. 5.

The operation of the system will now be described. Unless specifically noted, the description applies equally to the embodiments of FIGS. 5 and 8.

Using the actuator 22, the crossbar 17 is raised enabling a tool 25 to be positioned over an appropriate guide rod 26. The crossbar 17 is then lowered until handle blocks 29 and 30 straddle the tool handles and apply appropriate downward loading pressure to tool 25. At the same time, the operating lever on the tool 25 will be depressed, it is conventionally located over one of the handles, to open the internal air valve arrangement. The piston 83 in the pressure cell 64 should be elevated in engagement with spacer 91 by hydraulic fluid previously introduced under pressure through fitting 65. Preferably the force developed on piston 83 by the weight of the tool 25 and the downward pressure produced by actuator 22 is selected to exceed the force developed by fluid pressure in cylinder bore 82 sufficient to just unseat piston 83 from contact with spacer 91. The downward force assures that the guide rod is in contact with the piston 83 during the full course of the piston strike preventing partial or full loss of the impact wave. The variable loading also enables assessment of the effect of bit weight on tool operation. The latter is important in the evaluation of rotary rock drills.

The handle blocks 29 and 30 are preferably removeably attached to the crossbar 17 so that blocks adapted to different power tools can be interchanged. The blocks firmly hold the power tool, preventing rotation and translational movement.

To run a test, the computer system is activated with the computer program requesting the user to select the manufacturer, brand, model, and so forth to identify the particular tool to be tested. Incidental to this aspect of the invention, the computer database stores data as to the serial or inventory control number of the specific tool, its past history as to performance and maintenance. The system retrieves the tool's pertinent history including date of purchase, purchase cost, cumulative repair records and the manufacturer recommended performance values. A set of on-screen instructions are provided which specify the sequence of events required to test the specific tool.

The tool is activated upon manipulating the valve handle 53 to open valve 48, the valve lever on the tool handle being held in valve opening position by the pressure of the handle block. The sensors 42, 43 and 44 feed signals to the computer through the interface unit 45 which signals are converted to digital form indicative of the energy being supplied to the tool under test. This information can then be converted by the program to the output to be expected from the measured input energy. The impact force produced by the test tool is sensed by the pressure cell 64 and transmitted by transducer 66 to the computer along with the rotation information provided by sensor 68 from speed assembly 63. By ascertaining the number of revolutions sensed within a given time interval, the speed of rotation is determined. This information is then compared with the specification requirements in the database to provide an indication of the operating efficiency of the tool. With the embodiment of FIG. 9, each tooth of the gear 200 produces an output pulse as it passes in front of the sensor 205. The number of pulses sensed within a given time interval provides the necessary information for determining rotary speed.

Having described the present invention by reference to the presently preferred embodiments thereof it should be apparent to those skilled in the subject art that various changes in construction and operation can be adopted without departing from the true spirit of the invention as defined in the appended claims.

What is claimed is:

1. A system for measuring the performance of impact and impact-rotary tools comprising in combination a test stand for vertically mounting a tool whose performance is to be measured, means for supplying operating power to said tool including means for measuring the energy utilized by said tool, means for measuring an output of said tool, and means for comparing the measured output of said tool against a standard output correlated to said utilized energy, wherein said means for measuring an output of said tool comprises a hydraulic cylinder with a longitudinal axis vertically oriented, a piston disposed within said cylinder for axial movement, circumferential sealing means disposed between said piston and cylinder for developing a hydraulic seal therebetween, said cylinder having one end closed defining with said piston a chamber that is pressurizable with hydraulic fluid to urge said piston toward an open opposite end of said cylinder, vertically oriented guide means for receiving a tool output rod and for positioning said rod coaxially aligned and in engagement with said piston for driving said piston against said hydraulic fluid to further pressurize said fluid, pressure sensing means coupled to said cylinder for sensing the fluid pressure in said chamber, a rotatable member having a centered through opening mounted between said guide means and said open end of said cylinder with said through opening constructed and positioned to receive therethrough with a sliding fit said tool output rod, means for coupling said rod to said rotatable member for rotatably driving said member in step with rotation of said rod, and means for providing an output signal as a function of the rotation of said rotatable member representing the speed of rotation of said tool, whereby an indication of operating efficiency of the tool is established by comparing the measured output including said speed of rotation to a standard output correlated to said utilized energy.

2. A system according to claim 1, wherein said rotatable member is disc shape with a gear toothed perimeter having circumferentially uniformly disposed teeth, and a magnetic sensor is mounted adjacent the toothed perimeter of said rotatable member responsive to movement of said teeth past the sensor for providing a signal as a function of the rotation of said rotatable member.

3. A system according to claim 1, wherein said rotatable member and said tool output rod are coupled by a keyway and key assembly.

4. A system according to claim 1, wherein said rotatable member is disc shape, a spectral reflective marker is disposed on said rotatable member, and photo-optical means is provided for providing a signal responsive to the passing of said marker past a predetermined point.

5. A system for measuring the performance of impact and impact-rotary tools comprising in combination a test stand for vertically mounting a tool whose performance is to be measured, means for supplying operating power to said tool including means for measuring the energy utilized by said tool, means for measuring an output of said tool, and means for comparing the measured output of said tool against a standard output correlated to said utilized energy, wherein said means for measuring an output of said tool comprises a hydraulic cylinder with a longitudinal axis vertically oriented, a piston disposed within said cylinder for axial movement, circumferential sealing means disposed between said piston and cylinder for developing a hydraulic seal therebetween, said cylinder having one end closed defining with said piston a chamber that is pressurizable with hydraulic fluid to urge said piston toward an open opposite end of said cylinder, vertically oriented guide means for receiving a tool output rod and for positioning said rod coaxially aligned and in engagement with said piston for driving said piston against said hydraulic fluid to further pressurize said fluid, and pressure sensing means coupled to said cylinder for sensing the fluid pressure in said chamber, and wherein said test stand comprises a base on which is mounted said hydraulic cylinder with the longitudinal axis of said cylinder perpendicular to said base, a pair of parallel upright spaced apart standards supported by said base, the standards and said axis of said cylinder lying substantially in a common plane and said cylinder located substantially midway between said standards, a crossbar mounted between said standards for movement along said standards toward and away from said base, a header adjustably securable to said standards above said crossbar, actuator means mounted on said header and coupled to said crossbar for positioning said crossbar, and means supported by said crossbar for engaging operating handles of said tool to simultaneously position said tool, secure said tool in said test stand, and apply loading pressure to said tool.

6. A system according to claim 2, wherein said means for supplying operating power to said tool and means for measuring the energy utilized by said tool comprise a fluid conduit for supplying compressed air to said tool, said conduit comprising a plurality of sensors tapped into walls of said conduit for sensing, respectively, fluid flow, fluid pressure, and fluid temperature, and a control valve for opening and closing said conduit to the passage of said air.

7. A system according to claim 5, wherein said means supported by said crossbar further comprises means for actuating an operating lever mechanism of the tool for causing the tool to operate in response to feeding operating power thereto.

8. A system according to claim 5, wherein a rotatable member having a centered through opening is mounted between said guide means and said open end of said cylinder with said through opening constructed and positioned to receive therethrough with a sliding fit said tool output rod, means for coupling said rod to said rotatable member for rotatably driving said member in step with rotation of said rod, and means for providing an output signal as a function of the rotation of said member.

9. A system according to claim 8, wherein said rotatable member and said tool output rod are coupled by a keyway and key assembly.

10. A system according to claim 8, wherein said rotatable member is disc shape, a spectral reflective marker is disposed on said rotatable member, and photo-optical means is provided for providing a signal response to the passing of said marker past a predetermined point.

11. A system according to claim 8, wherein said rotatable member is disc shape with a gear toothed perimeter having circumferentially uniformly disposed teeth, and a magnetic sensor is mounted adjacent the toothed perimeter of said rotatable member responsive to movement of said teeth past the sensor for providing a signal as a function of the rotation of said rotatable member.

12. A system for measuring the performance of impact and impact-rotary tools comprising in combination a test stand for vertically mounting a tool whose performance is to be measured, means for supplying operating power to said tool including means for measuring the energy utilized by said tool, means for measuring an output of said tool, and means for comparing the measured output of said tool against a standard output correlated to said utilized energy, wherein said means for measuring an output of said tool comprises a hydraulic cylinder with a longitudinal axis vertically oriented, a piston disposed within said cylinder for axial movement, circumferential sealing means disposed between said piston and cylinder for developing a hydraulic seal therebetween, said cylinder having one end closed defining with said piston a chamber that is pressurizable with hydraulic fluid to urge said piston toward an open opposite end of said cylinder, vertically oriented guide means for receiving a tool output rod and for positioning said rod coaxially aligned and in engagement with said piston for driving said piston against said hydraulic fluid to further pressurize said fluid, pressure sensing means coupled to said cylinder for sensing the fluid pressure in said chamber, a rotatable member having a centered through opening mounted between said guide means and said open end of said cylinder with said through opening constructed and positioned to receive therethrough with a sliding fit said tool output rod, means for coupling said rod to said rotatable member for rotatably driving said member in step with rotation of said rod, and means for providing an output signal as a function of the rotation of said rotatable member representing the speed of rotation of said tool and wherein said means for supplying operating power to said tool and means for measuring the energy utilized by said tool comprise a fluid conduit for supplying compressed air to said tool, said conduit comprising a plurality of sensors tapped into walls of said conduit for sensing, respectively, fluid flow, fluid pressure, and fluid temperature, and a control valve for opening and closing said conduit to the passage of said air whereby an indication of operating efficiency of the tool is established by comparing the measured output including said speed of rotation to a standard output correlated to said utilized energy.

13. A system according to claim 12, wherein said rotatable member is disc shape with a gear toothed perimeter having circumferentially uniformly disposed teeth, and a magnetic sensor is mounted adjacent the toothed perimeter of said rotatable member responsive to movement of said teeth past the sensor for providing a signal as a function of the rotation of said rotatable member.

14. A system according to claim 12, wherein said rotatable member and said tool output rod are coupled by a keyway and key assembly.

15. A system according to claim 12, wherein said rotatable member is disc shape, a spectral reflective marker is disposed on said rotatable member, and photo-optical means is provided for providing a signal responsive to the pressing of said marker past a predetermined point.

* * * * *

UNITED STATES PATENT AND TRADEMARK OFFICE
CERTIFICATE OF CORRECTION

PATENT NO. : 5,277,055
DATED : January 11, 1994
INVENTOR(S) : Pittard et al

It is certified that error appears in the above-indentified patent and that said Letters Patent is hereby corrected as shown below:

```
Column 4, line 57, after "to", "e" should read --be--.

Column 6, line 49, after "interval" delete comma ",".

Column 8, line 51, "response" should read --responsive--.

Column 9, line 24, after "tool" insert comma --,--.

Column 10, line 5, after "air" insert comma --,--; line 25,
 "pressing" should read --passing--.
```

Signed and Sealed this

Fourteenth Day of June, 1994

Attest:

BRUCE LEHMAN

*Attesting Officer*     *Commissioner of Patents and Trademarks*